United States Patent [19]

De Brie Perry

[11] Patent Number: 4,638,687
[45] Date of Patent: Jan. 27, 1987

[54] CONTINUOUSLY-VARIABLE-RATIO TRANSMISSION HAVING A SINGLE INPUT MEMBER

[75] Inventor: Forbes G. De Brie Perry, Charlbury, England

[73] Assignee: National Research Development Corporation, London, England

[21] Appl. No.: 738,470

[22] Filed: May 28, 1985

[30] Foreign Application Priority Data

May 30, 1984 [GB] United Kingdom ................ 8413728

[51] Int. Cl.[4] ..................... F16H 37/06; F16H 37/00
[52] U.S. Cl. ........................................ 74/691; 74/740
[58] Field of Search ................ 74/691, 194, 196, 197, 74/740

[56] References Cited

U.S. PATENT DOCUMENTS

| | | | |
|---|---|---|---|
| 2,283,759 | 5/1942 | Pollard | 74/691 X |
| 2,646,696 | 7/1953 | Kepes | 74/691 |
| 3,406,597 | 10/1968 | De Brie Perry | 74/865 |
| 3,494,224 | 2/1970 | Fellows et al. | 74/691 |
| 3,620,101 | 11/1971 | Abbott et al. | 74/691 |
| 3,684,065 | 8/1972 | Scheiter | 74/691 X |
| 3,713,353 | 1/1973 | Scheiter | 74/691 X |
| 3,822,610 | 7/1974 | Erban | 74/691 |
| 3,823,613 | 7/1974 | Abbott | 74/691 X |

FOREIGN PATENT DOCUMENTS 2122289A 1/1984 United Kingdom .

Primary Examiner—Leslie A. Braun
Assistant Examiner—Dirk Wright
Attorney, Agent, or Firm—Cushman, Darby & Cushman

[57] ABSTRACT

A transmission of the two-regime, toroidal race rolling traction type. The output disc of the variator is supported by a rotary thrust bearing including rollers mounted in a rotatable cage. In the second regime, which is in action during the higher-speed ranges of forward drive, the output disc is connected to the final drive through an epicyclic. In the first regime, in action during the whole of reverse drive and the lower-speed ranges of forward drive, the cage of the thrust bearing is connected to the final drive by way of a one-way clutch and a lock arranged in parallel: in the reverse part of the regime the lock is engaged to prevent the clutch overriding, and in the remaining forward part of the regime the lock is open and the clutch operates directly because of the reversal of direction. The cage may contain an array of single rollers symmetrically arranged, each rotatable about an axis which intersects the axis of the cage itself obliquely. Alternatively the roller units within the cage may rotate about axes which intersect the cage axis at right angles, but each roller unit may comprise a stack of individual rollers capable of rotating at different speeds so as to accommodate the different radii at which they bear against their co-operating thrust races.

8 Claims, 4 Drawing Figures

CONTINUOUSLY-VARIABLE-RATIO TRANSMISSION HAVING A SINGLE INPUT MEMBER

This invention relates to continously-variable-ratio transmissions, of the kind which are suitable for instance to connect the prime mover of an automatic vehicle to the driven wheels, and the operation of which can be divided clearly into two distinct phases or "regimes". Such transmissions essentially comprise two components: a first component which will be referred to as the variator and adjustment of which varies the ratio of the transmission, and a secondary component, usually located between the variator and the output of the transmission. The secondary component includes gearing and is capable of being set in different combinations whereby the transmission works in one regime or the other.

The essential operation of such a transmission will now be explained. Assume that the input to the transmission is being driven by the prime mover at a constant speed and that the first regime is in operation, with the variator set to one extreme position. Typically the output or final member of the transmission will now be rotating in its reverse direction. If now the setting of the variator is progressively changed so as to approach the opposite or second extreme, the speed of the final member progressively falls until a point is reached, before that second extreme is reached, at which the speed is zero. The setting of the transmission at which that condition occurs is commonly known as "geared idle". As the setting of the variator then continues to progress to the second extreme, the final member begins to rotate in the forward direction with increasing speed. If when the second extreme setting is reached the secondary component of the transmission is adjusted to connect the second regime in place of the first, and the setting of the variator is progressively moved back to the first extreme, the rotation of the final member remains in the forward sense and increases steadily to maximum forward speed.

Such a tranmission is shown, for example, in UK Patent No. 1078791, where the variator is of the toroidal race, rolling traction type in which the variator comprises at least one input disc which is rotated by the prime mover and which has a coaxial toroidal race formed on one face. The output of the variator includes a coaxial output disc formed with a similar and confronting toroidal race, the surfaces of the two confronting races together forming part of the surface of a single imaginary torus. Traction is transmitted from input to output discs across the torus by means of sets of rollers, each of which contacts both races and is mounted to rotate with its diameter substantially tangential to the torus centre circle, and with its axis of rotation intersecting the common axis of the two discs. By altering the setting of the rollers so that their diameter remains tangential to the torus centre circle but so that the axis of rotation of each roller moves to intersect the common axis of the discs at a differnt point, the ratio between the speeds of the input and output discs, and thus the ratio transmitted by the transmission as a whole, is varied.

The present invention applies particularly to a transmission, as just described, capable of working in two regimes and in which the variator is of the toroidal race rolling friction type. It applies especially to such a transmission in which the variator is not "double-sided"—that is to say, comprising two input discs with a single output disc in between them —as shown in UK No. 1078791, but is instead of the "single-sided" type comprising an output disc and only one input disc, as shown for example in published UK Application No. 2122289A. A single-sided unit, while having the obvious advantage over a double-sided one of requiring less parts, tends in practice to have the disadvantage of greater difficulty in providing for the considerable end thrust necessary to urge the input and output discs axially together and so into positive engagement with the rollers that separate them, so that the rollers transmit adequate torque from one disc to the other. In a single-sided transmission of the rolling traction type, the power source to exert this end thrust commonly acts upon the input disc, and the output disc is supported by a rotary thrust bearing itself fixed to the input shaft by which the input disc is driven.

The present invention applies particularly to a transmission using such a thrust bearing, and seeks to simplify the transmission both by giving a rotary component of that thrust bearing a further use as a component of the secondary component of the transmission, and by simplifying the transmission generally. According to the invention a transmission of the toroidal race rolling traction type and having at least first and second regimes of operation has a variator the output member of which is supported by a rotary thrust bearing, in which a rotary part of that thrust bearing serves also in the combination of the secondary component of the transmission that is operable in the first of the regimes, and in which that combination also includes two one-way drive members arranged in parallel so that drive is transmitted automatically through a first one of those drive members during a first part of that regime during which the transmission output is rotating in a first direction and drive automatically transfers to the second one-way drive member for the remainder of the regime during which transmission output rotates in the opposite direction.

In the first regime the rotary bearing part may be connected directly to the two one-way drive members arranged in parallel, and from them directly to the output of the transmission, so that the output rotates at the same speed as the rotary bearing part and in the same sense.

The thrust bearing may be of the form comprising one race fixed to the variator output member, a second race fixed to the variator input member, and a rolling member which is located between and in contact with the two races. The rolling member constitutes the rotary part already referred to, and its motion is the resultant of the different motions of each of the two races.

In the second regime the transmission output may be connected to the variator output member alone, by a route including reversal of direction. This reversal may be obtained by means of gearing of epicyclic type, the planet carrier being anchored, and with the variator and transmission outputs being connected to the sun and annulus respectively.

The rotary thrust bearing may comprise caged rollers running between the two annular races, the rollers being mounted within the cage to rotate about axes that intersect the main transmission axis, that is to say the axis of rotation of both the discs of the variator. The angle at which the axes of rollers and transmission intersect may not be a right angle: within practical limits it can differ from a right angle to an extent necessary to help achieve whatever ratio ranges are required of the transmission.

Especially in the case where the axes of the rollers and the transmission as a whole do intersect at right angles, the maximum thrust which the bearing is capable of withstanding may be enhanced by making each roller within it not a single unit, but a composite one comprising a group of sub-rollers mounted to rotate about a common axis relative to each other, such axis coinciding with what would be the axis of a single roller if it were used in their place. The common axis may be set by a spindle fixed to one of the sub-rollers, the others being annular and journalled on the spindle. As the cage rotates in operation, because of the different radii at which they are located relative to the transmission axis there will be relative rotation between each sub-roller and its neighbours within each group, but the clearance between adjacent sub-rollers may be lubricated—for instance by oil supplied to the group by way of a lubrication channel formed axially within the common spindle—so as to keep any losses resulting from such relative movement within bounds.

The invention will now be described, by way of example, with reference to the accompanying drawings in which.

Figure 1:
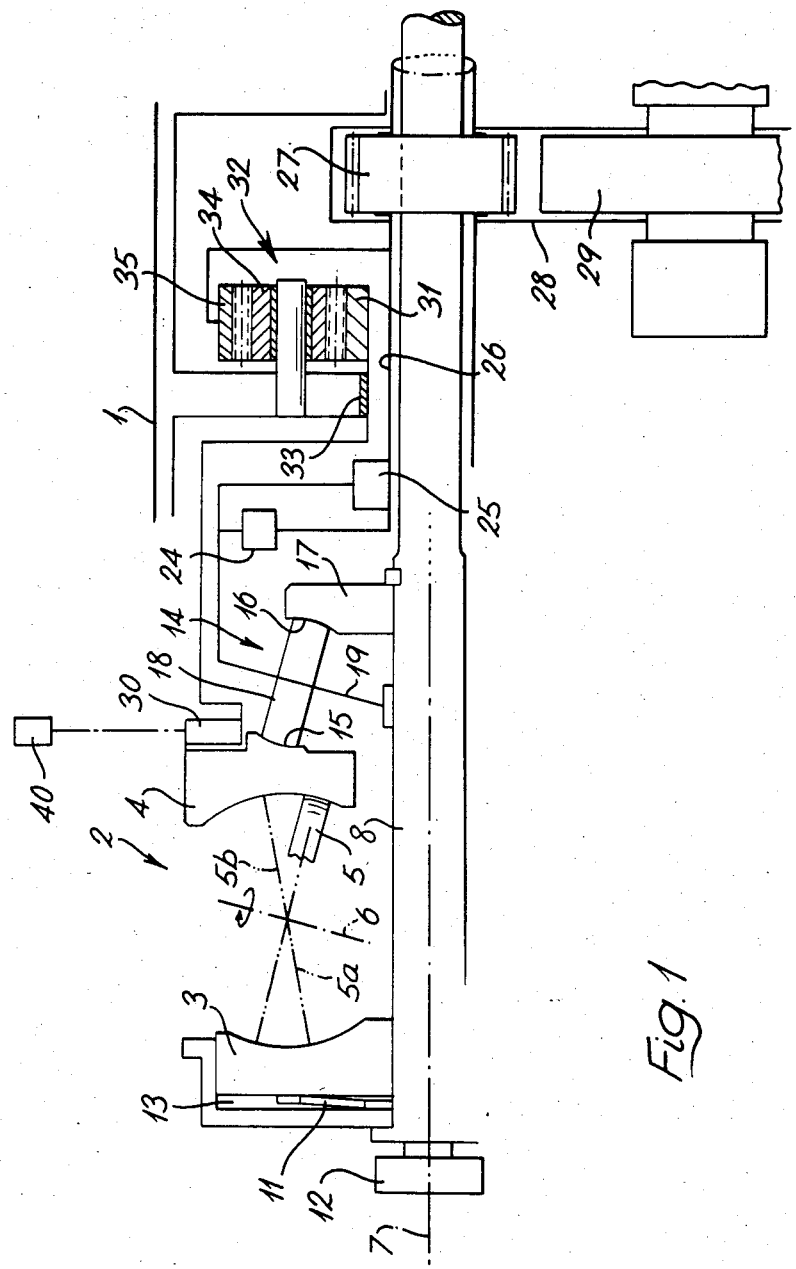
FIG. 1 is a diagrammatic axial section through one transmission.

A transmission of the toroidal-race, rolling traction type comprises a fixed housing 1 and a variator 2 comprising an input disc 3 and an output disc 4 between which traction is transmitted by rollers 5 mounted on structure 6a (shown in outline in FIG. 2) to rotate about axes 6. The axes 6 always intersect transmission axis 7—that is to say, the common axis of rotation of discs 3 and 4—but in a manner that is well known in the art although no part of the present invention the bearings supporting the rollers 5 are movably mounted so that the angle of intersection of the roller and transmission axes may be varied to alter the ratio between the speed at which disc 3 is rotated by input shaft 8, and the speed at which output disc 4 rotates in the opposite sense.

Input disc 3 is splined to shaft 8 and capable of slight axial movement along the spline. In use, a Belleville washer 11 and fluid pressure (generated by a source 12) within a chamber 13 formed between housing 1 and the rear face of disc 3 urge that disc axially towards output disc 4, so as to create a reaction between the two discs and the rollers 5 that is adequate to transmit the required torque from one disc to the other. Disc 4 is mounted to rotate about axis 7 because it forms one unit of a thrust bearing 14. The rear face of unit 4 presents one race 15 of that thrust bearing, the opposite race 16 being presented by an annular abutment 17 fixed to shaft 8. Between the two races run rollers 18 of which one, rotating about an axis 19, is shown. Rollers 18 are mounted in bearings 20 in a cage 21 supported from shaft 8 by bearings 22, and the cage is connected by cylindrical structure 23 (indicated schematically in FIG. 2) to a one-way rotary drive member 24 and to a locking member 25 arranged in parallel. Member 24 may be in the form of a sprag or other ratchet-type unidirectional clutch, which locks when its two components tend to move relative to each other in one direction, but completely separate when the tendency to relative movement is in the opposite direction. Member 25 may for instance be a hydraulically-operated tooth clutch. Parallel members 24 and 25 are connected to a single sleeve-type output member 26 carrying a gear 27 which constitutes the output member of the transmission as a whole and is connected by a chain 28 to a final drive gear 29.

The variator output disc 4 is also connected to gear 27 by a different route comprising a clutch 30 and the sun 31 of an epicyclic unit 32. Sun 31 is journalled on a bearing 33 mounted on housing 1, and the planets 34 of the epicyclic (of which only one is shown in FIG. 1) are also fixed to housing 1. The annulus 35 is fixed to sleeve 26.

Assume that rollers 5 are at the setting in which one of them is indicated in full lines in FIG. 1, and regime-changing mechanism (of a kind well known in the art and shown diagrammatically at 40) is operative to disengage clutch 30 but connect the outputs of parallel members 24, 25 to the transmission output gear 27. The transmission is now working in its first regime. As always, discs 5 operate to rotate the output disc 4 in the opposite direction to that of input disc 3, and the illustrated setting of rollers 5 is such as to rotate disc 4 at its maximum speed, which is higher than any given speed at which input disc 3 is rotating in the opposite direction. There is therefore a difference in both magnitude and sign between the rotations of races 15 and 16. Cage 21 therefore rotates. Sprag 24 and lock 25 are so arranged that the lock engages and prevents the sprag overriding, so that lock 25 communicates drive from cage 21 to output 27, which rotates at its highest reverse speed.

Figure 2:
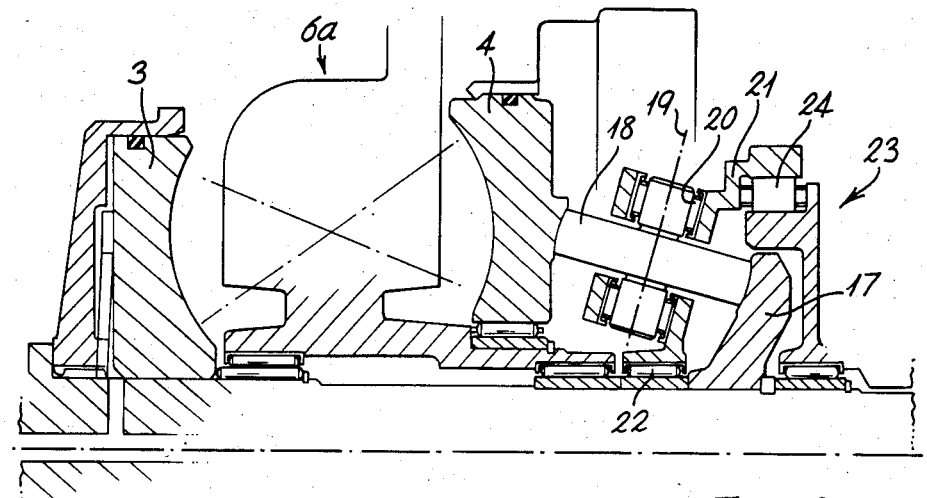
FIG. 2 is an axial section showing certain parts of the transmission of FIG. 1 in greater detail.

If the setting of rollers 5 is now changed so that they approach the opposite extreme position indicated at 5a in FIGS. 1 and 2, a position (5b) is reached when the inclinations of the roller axes 6 and 19 to the transmission axis 7 will give opposing speed ratios such that races 15 and 16 will be rotating at equal rolling speeds in their opposite directions, and cage 21 and gear 27 will be stationary. The transmission is now effectively in neutral, in the condition known in the art as "geared idle". Locking member 25 may now be disengaged. If the movement of the rollers towards position 5a now continues, the magnitude of the angular velocity of race 15 continues to decrease relative to that of race 16, so that cage 21 rotates again with increasing speed but in the direction opposite to that in which it was rotating before the geared idle point was reached. This automatically engages sprag member 24 so that it is the sprag that drives output gear 27 in the forward direction.

Movement of rollers 5 between settings 5b and 5a, with unit 40 operating to engage first regime, thus takes the transmission from geared idle through the lower ratios of forward drive. Setting 5a is chosen so that if at that setting of rollers 5 unit 40 is changed over so that clutch 30 is engaged, and cage 21 is disconnected from output 27, thus engaging second regime in place of first, there is no instantaneous change of the ratio transmitted from disc 4 to output 27. Such a change is known in the art as a synchronous change. Drive is now transmitted from disc 4 to transmission output 27 by way of clutch 30 and the three components (sun 31, planets 34 and annulus 35) of epicyclic 32, the epicyclic components being dimensioned not only to help set the right ratio range for second regime but also to impose a change of direction between disc 4 and gear 27 and thus ensure that gear 27 continues to revolve in the forward sense, just as it did in the latter stages of the first regime. If now the setting of the rollers 5 is progressively changed back again to the original position in which one of them is shown in full in FIG. 1, the speed of rotation of disc 4 and thus also of output gear 27 rises steadily until the latter is rotating at maximum forward speed, sprag member 24 all the time being overridden and thus disengaged from output 27.

Normal bearing practice dictates, as FIGS. 1 and 2 show, that the working faces of rollers 18 should be radiussed and that the co-operating faces of races 15 and 16 should be radiussed to match. As FIG. 3 indicates, the radius 42 of these working faces could deliberately be reduced to a value below what normal bearing practice might otherwise suggest, to improve roller-centering action under end load forces, so counteracting roller centrifugal effects. The cross-radius 43 of the rollers should of course be chosen so as to optimise life, EHL operation, etc.

By way of example, the following quantities might apply in a transmission as described with reference to FIGS. 1 and 2:

$R_{VMZX}$, i.e. speed ratio disc 4/disc 3, without regard to sign, when rollers 5 are in extreme position shown in full in FIG. 1. = 1.5

$R_3$, i.e. ratio of gear 29/gear 27 = 2

$E_2$, i.e. reduction of epicyclic 32 = 2

$E_I$, i.e. the ratio between the radii, measured from 7, of races 15 and 16 = 1.05

This ratio therefore defines the "tilt" of roller 18 and its axis of rotation 19. It will be apparent that the "geared idle" condition exists when rollers 5 are at a setting (indicated at 5b) of equal but opposite speed ratio. The principal practical factors for choosing a particular value of $E_I$ include the attainment of the correct reverse and full overdrive ratios.

$R_{VO}$, i.e. the ratio (without regard to sign) of the speeds of rotation of disc 3 and 4 at "geared idle", when rollers 5 are in position 5b = 0.95

$R_{VSYNCH}$, i.e. the ratio (without regard to sign) of the speeds of rotation of discs 3 and 4 when rollers 5 are in position 5a, so permitting a synchronous change to take place = 0.49

Figure 3:
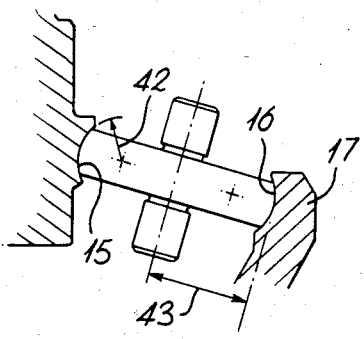
FIG. 3 shows part of a modified thrust bearing diagrammatically.
Figure 4:
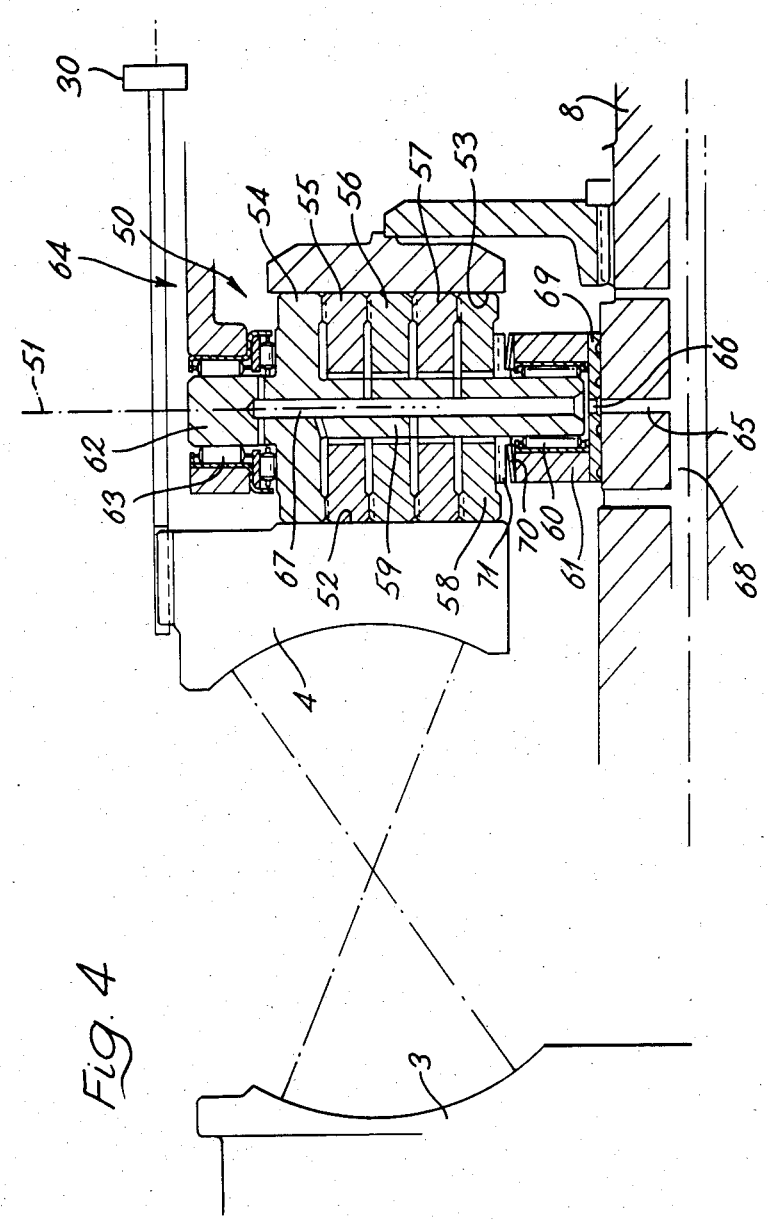
FIG. 4 is an axial section through yet another thrust bearing.

In the alternative construction shown in FIG. 4 the roller unit 50 is the equivalent of one of the rollers 18 of the previous Figures, and because the axis of rotation 51 of the unit is at right angles to axis 7 there are now no centrifugal effects requiring the working faces of the rollers, and the corresponding faces of the races against which they bear, to be strongly radiussed as at 42 in FIG. 3. The faces of races 52 and 53 are therefore flat, and the rollers are essentially cylindrical but of course profiled for the required EHL action. If the roller units 50 each comprised a single roller, however, its considerable dimension measured along the axis 51 would mean that there could be perfect rolling between that roller and races 52, 53 at only one radius (relative to axis 7), with increasing relative motion and resultant wear and loss at all other radii. According to the aspect of the invention illustrated in FIG. 4 such a problem is diminished by forming unit 50 not as a single roller but as a stacked group of five sub-rollers 54 to 58. Sub-roller 54 is in effect the master roller of the group and is integral with a central spindle 59 journalled in a bearing 60 formed in a member which constitutes the hub 61 of the roller cage 64, this hub being supported from input shaft 8 by a bearing 69. Rollers 55 to 58 are simple annuli rotating about spindle 59, the outer end 62 of which is journalled in a bearing 63 mounted in cage 64, these items being similar to the bearings 20 and structure 21 of FIG. 3. Main and subsidiary oil conduits 65 to 67 in shaft 8, hub 61 and spindle 59 feed lubricant to the components of unit 50 and its associated bearings from a main lubricant supply conduit 68 formed within shaft 8. In operation, each of sub-rollers 54 to 58 will be able in use to take up a speed of rotation, in response to the relative movement of races 52 and 53, that corresponds to the radius from axis 7 at which the particular sub-roller is situated. Because the dimension of each sub-roller in the direction of axis 51 is small, relative motion between the confronting flat faces of adjacent sub-rollers will be slight and the supply of lubricant to such interfaces by way of conduits 65 to 67 will be sufficient to avoid any harmful effects. Directional stability is given to sub-rollers 55 to 58 by lightly loading them axially against master roller 54 by means of a dished washer 70 and a thrust washer 71.

I claim:

1. A transmission of the toroidal race rolling traction type presenting a principal axis of rotation and having a rotary output capable of rotation in both forward and reverse directions and having at least first and second regimes of operation, and comprising a variator including a first, ratio varying component presenting an output member and an input and a secondary component including gearing capable of being set in different combinations so as to effect change-over between said first and second regime in which:

a rotary thrust bearing supports said output member of said variator;

said rotary thrust bearing includes a part serving also in the said combination of said secondary component that is operable in said first regime, and said combination of said secondary component that is operable in said first regime also includes a one-way drive member and a locking member arranged in parallel, through which drive is alternatively transmitted to said transmission output during said first regime according to whether said transmission output is rotating in said forward or said reverse direction; said one-way drive and locking members being arranged in parallel and connected directly both to said rotary thrust bearing part and to said rotary output of said transmission, so that said rotary output rotates at the same speed as said thrust bearing part and in the same rotary sense.

2. A transmission according to claim 1 in which said rotary thrust bearing comprises a first race rotating with said variator output member and a second race rotating with said variator input, and in which the said rotary part of said thrust bearing is a rolling member which is located between and in contact with said first and second races.

3. A transmission according to claim 1 including connecting means operable in said second regime for said rotary output of said transmission output to be connected direct to said variator output member, said connecting means including mechanism to cause a reversal of direction of rotation.

4. A transmission according to claim 2 in which said rotary thrust bearing part includes a cage and rollers mounted within said cage, said rollers presenting axes of rotation which obliquely intersect said principal axis of rotation of said transmission.

5. A transmission of the toroidal race rolling traction type presenting a principal axis of rotation and having a rotary output capable of rotation in both forward and reverse directions and having at least first and second regimes of operation, and comprising a variator including a first, ratio varying component presenting an output member and an input - and a secondary component including gearing capable of being set in different combinations so as to effect change-over between said first and second regimes in which:

a rotary thrust bearing supports said output member of said variator;

said rotary thrust bearing includes a part serving also in the said combination of said secondary component that is operable in said first regime, and said combination of said secondary component that is operable in said first regime also includes a one-way drive member and a locking member arranged in parallel, through which drive is alternatively transmitted to said transmission output during said first regime according to whether said transmission output is rotating in said forward or said reverse direction; said transmission further including connecting means operable in said second regime for said rotary output of said transmission output to be connected direct to said variator output member, said connecting means including a mechanism to cause a reversal of direction of rotation; said connecting means including gearing of epicyclic type comprising sun, planet carrier and annulus, said planet carrier being anchored, and with said output member of said variator and said rotary output of said transmission being connected to said sun and annulus respectively.

6. A transmission of the toroidal race rolling traction type presenting a principal axis of rotation and having a rotary output capable of rotation in both forward and reverse directions and having at least first and second regimes of operation, and comprising a variator including a first, ratio varying component presenting an output member and an input - and a secondary component including gearing capable of being set in different combinations so as to effect change-over between said first and second regimes in which:

a rotary thrust bearing supports said output member of said variator;

said rotary thrust bearing includes a part serving also in the said combination of said secondary component that is operable in said first regime, and said combination of said secondary component that is operable in said first regime also includes a one-way drive member and a locking member arranged in parallel, through which drive is alternatively transmitted to said transmission output during said first regime according to whether said transmission output is rotating in said forward or said reverse direction; said rotary thrust bearing comprising a first race rotating with said variator output member and a second race rotating with said variator input, said rotary part of said thrust bearing being a rolling member which is located between and in contact with said first and second races, said rotary thrust bearing part comprising a cage and roller units mounted within said cage, each said roller unit comprising a plurality of sub-rollers arranged stack-wise and rotatable about a common axis which intersects said principal axis of rotation of said transmission, each sub-roller transmitting a proportion of the total thrust between said first and second races and a proportion of the torque transmitted to said cage.

7. A transmission according to claim 6 in which said sub-rollers of each said stack share a common axis of rotation, said common axis intersecting said principal axis of rotation of said transmission at right angles, and in which both of said first and second races present flat faces lying in radial planes relative to that said principal axis.

8. A transmission according to claim 6 in which said sub-rollers of each said stack share a common axis of rotation, said common axis intersecting said principal axis of rotation of said transmission at right angles, and in which both of said first and second races present flat faces lying in radial planes relative to that said principal axis.

* * * * *